United States Patent [19]

Edwards

[11] 3,957,415
[45] May 18, 1976

[54] METHOD AND APPARATUS FOR CONVERTING NESTABLE PLASTIC CONTAINERS INTO NON-NESTABLE CONTAINERS PRODUCTS

[75] Inventor: Bryant Edwards, Clarendon Hills, Ill.

[73] Assignee: Illinois Tool Works Inc., Chicago, Ill.

[22] Filed: Apr. 15, 1974

[21] Appl. No.: 461,033

Related U.S. Application Data

[60] Division of Ser. No. 325,301, Jan. 22, 1973, and a continuation-in-part of Ser. No. 102,736, Dec. 30, 1970, abandoned.

[52] U.S. Cl. .......................... 425/387 B; 425/403; 425/455 R; 425/DIG. 213
[51] Int. Cl.² ........................................ B29C 17/00
[58] Field of Search .......... 425/DIG. 203, DIG. 208, 425/DIG. 102, 387 B, 242 B, 242, 387, 388, 397, 126 R, DIG. 213, DIG. 214, DIG. 206, DIG. 60, 403, 455 R

[56] References Cited
UNITED STATES PATENTS

| | | | |
|---|---|---|---|
| 3,680,763 | 8/1972 | Ludder | 229/1.5 B |
| 3,770,860 | 11/1973 | Amberg et al. | 425/DIG. 203 |
| 3,816,046 | 6/1974 | Farrell | 425/DIG. 208 |

*Primary Examiner*—Francis S. Husar
*Assistant Examiner*—Robert J. Charvat
*Attorney, Agent, or Firm*—Edward L. Benno; Robert W. Beart

[57] ABSTRACT

Method and apparatus for converting, by reshaping, thin-walled nestable plastic containers into non-nestable container products wherein the nestable container is telescopically mounted on and releasably locked to a complementary male mold member, the nestable container thereafter being heated to a predetermined temperature to permit ready deformation thereof, and subsequently expanded against the non-nestable inner wall configuration of a mold cavity by differential fluid pressure to form non-nestable container products. In order to mold uniform container products by a continuous molding operation, the nestable plastic container is held in fixed relation relative to the male mold member in the vicinity of its open mouth where the container is insulated from heat.

3 Claims, 26 Drawing Figures

METHOD AND APPARATUS FOR CONVERTING NESTABLE PLASTIC CONTAINERS INTO NON-NESTABLE CONTAINERS PRODUCTS

SUMMARY OF THE INVENTION

This is a division of application Ser. No. 325,301, filed Jan. 22, 1973, which is a continuation in part of applicant's co-pending application Ser. No. 102,736 filed Dec. 30, 1970, for BOTTLE REFORM METHOD AND APPARATUS, now abandoned.

In applicant's co-pending application Ser. No. 12,652, filed on Feb. 19, 1970, now abandoned, there is disclosed a reshaping technique for converting nestable plastic containers into non-nestable container products where all but the rim portion of the nestable container is heated and deformed to the desired non-nestable container shape, thus leaving the rim portion of the nestable container intact in the non-nestable container product. The rim portion in this reshaping process serves as a control feature in assuring continuous molding of generally uniform products, because the rim portion can be properly centered and sealed relative to a female mold cavity having a non-nestable inner wall configuration prior to the reshaping operation. Additionally, the use of generally the same dimensional configuration for the rim portion in the nestable container as well as the non-nestable container product that is ultimately formed avoids the necessity of removing flash or the like which is inherent in typical blow molding operations.

The aforementioned reshaping technique makes it possible for the nestable plastic container to be fabricated by a large volume manufacturer who has the forming equipment and desired quality standards that are necessary to product high volume, low cost, quality products. The preformed nestable plastic containers can then be stacked and shipped in cartons, much in the same way as vending cups and dairy food containers are stacked and shipped today, to the non-nestable container fabricator where the reshaping or converting process takes place. In addition to being nestable it is desirable to include stacking means in the nestable containers to avoid jamming of adjacent containers in a stack during storage and transport.

In most instances, the non-nestable container fabricator will also be the party that fills the non-nestable containers for consumption by the ultimate user. To accomplish this, the non-nestable container fabricator will utilize a machine, perhaps immediately adjacent to the filling line, where the nestable plastic containers are reshaped to non-nestable container products. To assure high-speed manufacture of consistently uniform products, it is necessary to devise a machine for the automatic loading of nestable containers into a molding machine with the subsequent automatic forming of the nestable containers into non-nestable container products and the eventual discharge of the non-nestable container products from the molding machine in a predetermined array. There is disclosed by the present invention a machine for achieving the aforementioned objectives.

One of the problems which, up until now, remained unsolved in the above described reshaping technique was the difficulty of uniformly heating the nestable plastic container to a temperature where it was readily deformable such that during the reshaping operation, no thick or thin areas in the non-nestable container products were produced. Heat applied through a male mold member, over which the nestable container had been telescoped and held thereto by a negative air pressure, tended to cause slippage of the container on the male mold member due to the tendency of the nestable container to shrink prior to being formed into a non-nestable container. Generally, plastic containers which are produced by the sheet forming or thermoforming process have a molecular orientation generally in the direction of the mechanical and/or pressure expansion of the sheet. Typically, this is in a direction lengthwise or along the axis of the container. Thus, when such a nestable container is mounted upon a complementary male mold member for subsequent heating thereof as is necessary in the reshaping operation presently being discussed, the nestable plastic container, even though it is held by a negative air pressure to the male mold member, has a tendency to shrink in the lengthwise or axial direction of the container, thus causing slippage of the container on the male mold member.

The result is that it was impossible to consistently form non-nestable container products of uniform quality. Where high speed molding of products is contemplated, it is important that the process be designed to manufacture the ultimately desired products of consistently uniform quality. Further, dimensional characteristics for specific products, such as open mouth containers which are subsequently filled and then capped, is important since the filling and capping operations are typically automatic operations which have been preset to the dimensional configuration of the container that is to be filled and capped.

To overcome the problem of dimensional variances along with undesirably strong or weak areas in the non-nestable containers produced by the reshaping operation, it was discovered that it was possible to mold the nestable container in relatively fixed position to its respective male mold member upon which it was mounted by releasably locking the nestable container to the male mold member in the vicinity of the non-heated rim portion thereof, such that it was possible to subsequently heat the remainder of the nestable container for the eventual reshaping operation.

The solving of this problem also made it advantageous to devise a continuous molding machine and method, utilizing the reshaping techniques heretofore discussed, which produced non-nestable containers by repetitive processing. The herein disclosed continuous molding machine enables nestable containers to be deposited on rotary mounted male mold members, then releasably locked thereto at an early stage in the forming cycle, heated to the desired forming temperature, and then finally formed into non-nestable container products.

Accordingly, it is an object of the present invention to overcome the aforementioned deficiencies of presently existing reshaping processes and apparatus.

More specifically, it is an object of this present invention to provide a method and apparatus for fabricating nestable plastic containers having stacking means into non-nestable container products of substantially uniform dimensions and thickness.

Another object of the present invention is a method and apparatus for the high-speed economical production of non-nestable containers of consistently uniform and high quality.

These and other objects and advantages of the present invention are attained by a method and apparatus for manufacturing the non-nestable containers which includes: providing nestable containers with stacking means, tamping the nestable container in fixed relative position to a complementary configured male mold member telescoped therewith, heating the nestable container below the rim portion while mounted on the male mold member to a temperature where the nestable container below the rim portion is readily deformable, inserting the male mold member with the heated nestable container thereon into a female mold cavity having a non-nestable inner wall configuration, sealing off the nestable container at the rim portion from the mold cavity, and thereafter expanding the heated nestable container below the rim portion against the non-nestable inner wall configuration of the female mold cavity by differential fluid pressure while the container is held in fixed position relative to the male mold member to thereby form a non-nestable container product.

BRIEF DESCRIPTION OF THE DRAWINGS

FIG. 9 is a view similar to FIGS. 5-8 and depicts the non-nestable container supported by a knock-out plug above the female mold and separated from the male mold such that ejection of the product from the mold means to a product removal apparatus may be affected by an air jet or the like;

DESCRIPTION OF THE PREFERRED EMBODIMENTS

The method and apparatus of the present invention is directed to the manufacture of a wide variety of shapes and sizes of hollow articles made from organic plastic material which has the characteristic of being rendered plastic by heat in order to permit it to be shaped into hollow articles such as bottles or containers. Several types of organic materials include polystyrene, polyethylene, and polyvinylchloride; but other materials within the general parameters outlined above may also be utilized.

Before considering the herein disclosed embodiments of the method and apparatus to which the present invention is directed, reference is first made to FIGS. 10-12, 15, 19, 21 and 25, which depict the shapes of nestable and non-nestable containers that are illustrated in describing the present invention.

Figure 11:
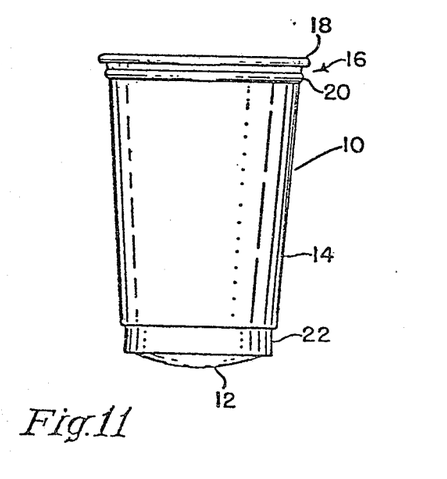
FIG. 11 is a side elevational view of an actual size nestable container which is shaped and dimensioned in accordance with the illustrations herein depicted.

The nestable plastic container 10, as shown in FIG. 11 of the drawing, includes a bottom wall 12 which is preferably outwardly bowed for purposes to be presently described, and upwardly extending side wall 14 which extends from the bottom wall 12 to an open upper end or open mouth of the container. At the open upper end there is provided a rim area 16 which includes a rim portion 18 in the form of radially outwardly directed rolled rim or curled lip. It will be apparent that various types of rim constructions, including thickened or flat lips and the like may be employed as desired.

The rim area 16 of the nestable container 10 also includes a circumferentially extending, radially outwardly directed bead immediately below the rim portion 18. The bead 20 is arranged to be engaged by a complementary configured lock portion provided on a male mold for holding the nestable container in fixed relative position to the mold during the subsequent heating and reshaping operation which will be described in more detail below. While the bead 20 of the nestable container 10 is circumferentially extending and radially outwardly directed, it may extend inwardly or be interrupted or both, it only be necessary that the bead is complementary configured relative to the locking portion of the male mold to be hereinafter described.

Since many nestable containers 10 will be produced in order to provide a high volume, low-cost, non-nestable container therefrom, it is necessary that each nestable container 10 be provided with a stacking means to limit telescoping between adjacent similarly configured nestable containers. The stacking means 22 that has been incorporated in the nestable container 10 is of the type depicted in U.S. Pat. No. 3,139,213 which consistently limits telescoping between thin-walled, nestable containers of substantially uniform thickness plastic material, as well as prevents damage thereto normally encountered during handling and shipping. While a stacking means of a different shape and location may be employed in the nestable container 10, the nestable container 10 is preferably a thin-walled nestable container having a substantially uniform in thickness configuration.

In preforming nestable plastic containers 10 the thermo-forming or sheet forming process may be employed since it is possible by that process to form thin-walled containers of substantially uniform thickness. The range of thicknesses at any location in thin-walled plastic containers which are produced by the thermo-forming process may be on the order of 0.008–0.025 inches in thickness, but it is to be understood that this range of thickness is given for exemplary emphasis only. While the thermo-forming process will cause variations in thickness at various locations in the nestable container, it is generally understood that the definition of substantially uniform thickness in the thermo-forming field means that the inner and outer surfaces of the container will have corresponding contours. The same meaning is to be employed here.

Figure 12:
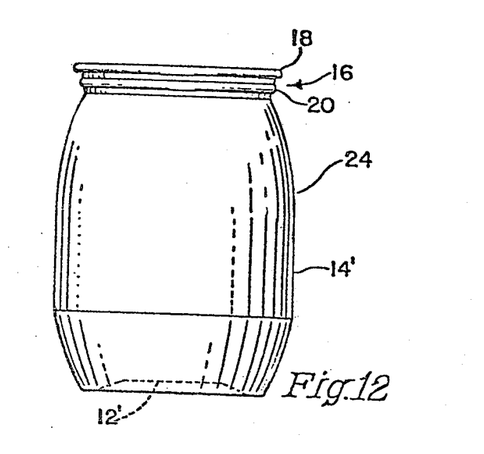
FIG. 12 is also a side elevational view of an actual sized non-nestable container which is shaped and dimensioned in accordance with the herein disclosed illustrations and formed from the nestable container shown in FIG. 11.

Nestable containers 10 of the type shown in FIG. 11 are reshaped or converted by the method and process of the present invention to the non-nestable container configuration 24 shown in FIG. 12 of the drawing. The particular shape of the non-nestable container 24 illustrated in FIG. 12 conforms to the inner wall configuration of the female mold cavity as will become apparent from the description that is to follow, it being understood that the freedom of design inherent in the reshaping process enables a great variety of non-nestable container shapes to be produced. The specific non-nestable container 24 illustrated in FIG. 12 of the drawing includes an inwardly bowed bottom wall configuration 12' which is formed from the outwardly bowed bottom wall 12 of the nestable container 10, a radially outwardly directed generally bulbous shaped sidewall 14' which was reshaped from the sidewall 14 including the stacking means 22 of the nestable container 10, and the rim area 16, including the rim portion 18 and a radially outwardly directed bead 20 of the nestable container 10 which remains generally the same shape and dimension as in the non-nestable container 24.

Figure 20:
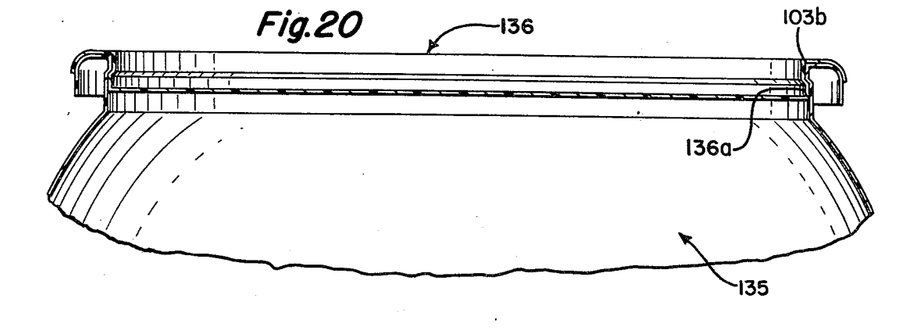
FIG. 20 is an enlarged fragmentary cross-sectional view of the reformed container of FIG. 19 with a lid applied to the container.

For a direct comparison between the nestable container 10 and the non-nestable container product 24, attention is directed to the enlarged sectional view FIG. 20 wherein there is illustrated a combined or overlay view of the nestable container 10 and non-nestable container product 24. Visual comparison of the nestable and non-nestable containers 10, 24, respectively, will readily indicate the areas of the nestable container 10 that are expanded to the non-nestable container shape 24. Particular attention is directed to the bottom walls 12 and 12' of the nestable and non-nestable containers 10, 24 respectively. The bottom wall 12 of the nestable container 10 is outwardly bowed in central axial cross-section in such a way that it resists deformation so as to provide additional material that is available for use during the reshaping process in order to form the upwardly directed bottom wall 12' of the non-nestable container 24. The outward bowing of the bottom wall 12 makes it unnecessary to unduly stretch the material in the forming of the upwardly directed bottom wall 12' of the non-nestable container 24 so as to avoid weakened areas in the bottom wall 12' or in the area of its juncture with the side wall 14'. It is thus possible to retain the same relative uniform in thickness configuration of the bottom wall 12' as in the bottom wall 12; that is, while the bottom wall 12' will be thinner, it will have the same relatively uniform thickness over the entire area thereof in the same proportion as the bottom wall 12. It should also be noted in a visual comparison that the stacking means 22 is completely removed in the reformed container 24.

The same principle applies to the relative uniform thickness between the sidewall 14 of the nestable container and the side wall 14' of the non-nestable container 24. This is principally due to the length over which the side wall 14 is expanded to form the bulbous wall 14' of the non-nestable container 24 as well as in part to the extra material incorporated in this stacking means 22. In a relative sense, therefore, the bulbous side wall 14' has the same uniform in thickness thin-walled configuration albeit generally thinner, than the substantial uniform in thickness thin-walled configuration of the side wall 14 associated with the nestable container 10.

Figure 10:
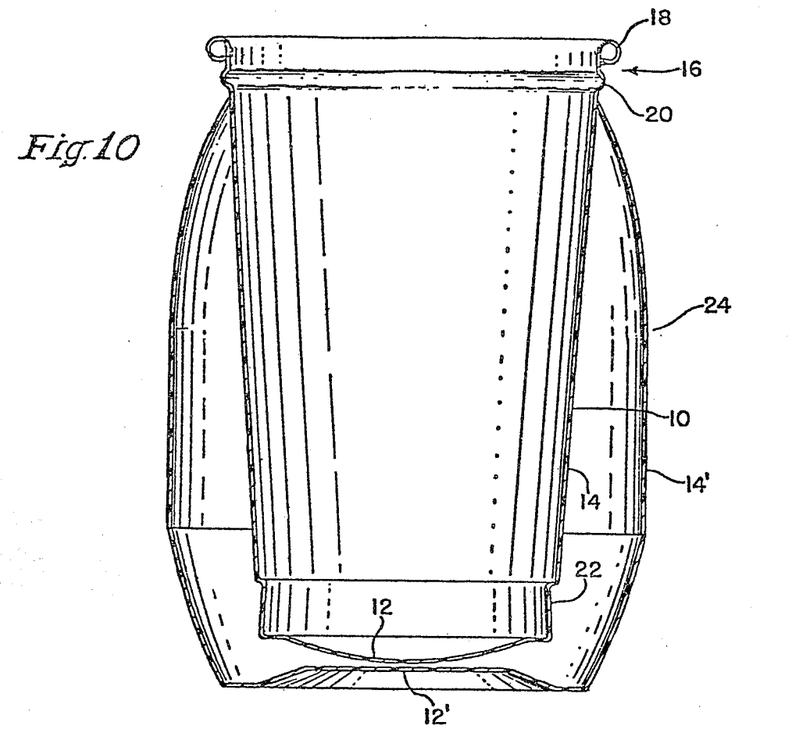
FIG. 10 is a combined enlarged sectional view of the nestable and non-nestable container shapes that are formed by the mold shapes herein illustrated to provide a comparison between the expanded and non-expanded areas of the nestable container.

As best seen in FIG. 10 of the drawings, the rim area 16, including the rim portion 18 and the bead 20, of the nestable containers 10 has the same configuration in the non-nestable container 24. This is due to the fact that the rim area 16 is insulated from the heat that is applied to the remainder of the nestable container 10 to affect the reshaping operation. This makes it possible for the bead 20 to be releasably engaged in complementary locking portion on a mold means with the advantage that the nestable container 10, particularly the side wall 14 thereof, may be expanded relatively uniformly to provide the same uniform in thickness relationship between side wall 14 and 14' of the nestable and non-nestable container 10, 24 respectively.

By virtue of the fact that the bead 20 of the nestable container 10 is retained in the non-nestable container 24, it is possible to utilize the bead 20 in retaining a snap-in lid complementary configured and associated therewith. In those instances where an overcap foil lid or the like is desired, the rim portion 18 may be utilized to permit the overcap, foil lid or the like to retain this type of lid member in assembled relationship to the non-nestable container as will be apparent. Other advantages of the bead 20 in the molding process that is to be described will be discussed in detail below.

The nestable container 10 and non-nestable container 24 illustrated in the drawing are examples of the type of the shaping that is possible by the method and apparatus of the present invention. The present invention is, therefore, not to be limited in terms of the particular shape and size of the nestable and non-nestable containers illustrated in the drawing. In considering the scope of the method and apparatus that is to be described in detail below, it will be understood that the term "nestable container" includes a configuration where the container is designed to have the capability of being nested or telescoped with an adjacent similarly configured container, while the term "non-nestable container" is intended to describe a container which is designed to prevent nesting or telescoping between adjacent non-nestable containers, although a partial nesting or telescoping may occur between limited areas of the top and bottom of adjacent non-nestable containers when stacked one atop the other.

Reference is now made to FIGS. 1-9 of the drawing for a description of the reshaping technique that is employed in converting the nestable container 10 to the non-nestable container product 24.

Figure 1:
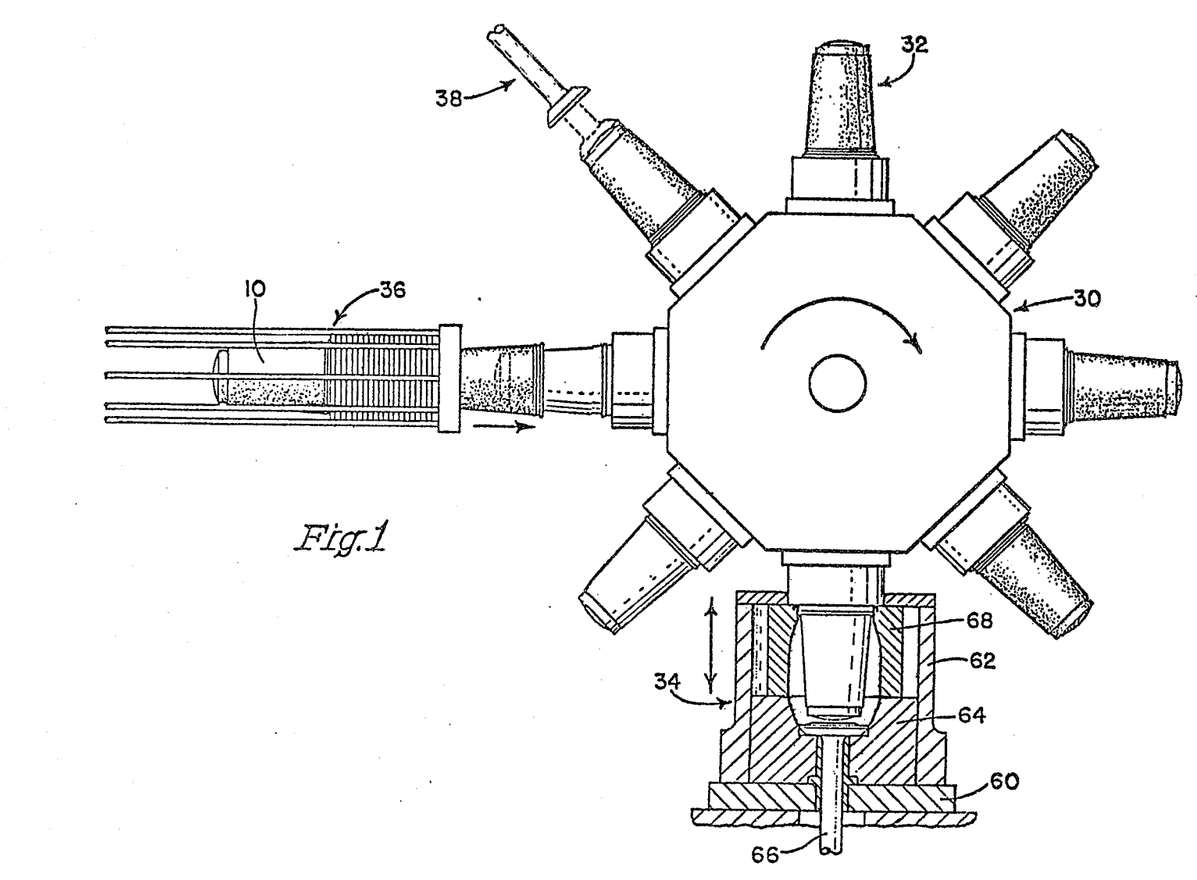
FIG. 1 is a fragmentary side elevational view, partially in section, of an apparatus constructed in accordance with the teachings of the present invention, which is also capable of carrying out the method of the present invention.

A general illustration of the apparatus used is depicted in FIG. 1 of the drawings. The apparatus includes a rotary turret 30 which is driven by suitable means (not shown) and having a plurality of male mold members 32 mounted thereon. In the illustrated embodiment, there are eight male mold members 32, each being mounted on one of the sides of the octagonally-shaped rotary turret face. The rotary turret 30 is indexed to move each male mold member 32 into cooperation with a female mold means 34 where nestable containers 10 mounted on the male mold members 32 are reshaped to the non-nestable containers 24. With eight male mold members 32 and a single female mold 34, a one second reshaping cycle is possible, thus producing sixty non-nestable containers per minute. It will be apparent that two or more rotary turrets 30 may be mounted in tandem to produce 120 or more containers per minute as may be desired. The particular number of male mold members 32 which are shown in the illustrated embodiment may be increased or decreased for a particular rotary turret as may be desired. Nestable containers 10 are mounted in the container dispensing device 36 and are deposited one at a time by suitable means (not shown) on a respective male mold member 32 when positioned immediately adjacent an inner stacking device. Nestable containers 10 are deposited on the male mold members 32 in synchronization with the indexing of the rotary turret.

In order to assure the proper seating or mounting of nestable containers 10 on the male mold members 32, an axial tamping device 38 is provided. The axial tamping device 38 engages the bottom wall of the nestable containers 10 to cause inter-engagement between complementary locking portions on the nestable container 10 and male mold members 32 as will be presently described.

The forming or molding cycle is begun by indexing a male mold member 32 mounted on the rotary turret 30 into position immediately adjacent the container dispensing device, at which time a nestable container 10 is moved from the end of the stack of nestable containers 10 by suitable means (not shown) and deposited on the male mold member 32 which is positioned adjacent the container stacking device 36. The movement of nestable containers 10 from the container stacking device 36, is, of course, synchronized with the indexing of the rotary turret 30 by suitable timing belts, chains, etc. (not shown) as may be suitable and desired.

With a nestable container deposited on the male mold member 32, the rotary turrent 30 is indexed, using clock time analogies, from approximately the nine o'clock position where it is immediately adjacent the container dispensing device 36 to a 10:30 o'clock position where it is immediately adjacent the axial tamping means 38. The axial tamping means 38 is also synchronized with the indexing of the rotary turret 30 such that when a nestable container is moved by its respective male mold member 32 into position immediately adjacent the axial tamping means, the axial tamping means 38 is operated to engage the bottom wall of the nestable container 10 to forcefully move the nestable container 10 into proper seated position on the male mold member 32. Proper seating of a nestable container 10 on a respective male mold member 32 occurs when the nestable container 10 is releasably locked to its respective male mold member 32. This is brought about by the locking inter-engagement of the bead 20 on a nestable container 10 with the locking portion of the male mold member 32 in the vicinity of the open mouth as will be discussed.

Figures 2, 3, 4:
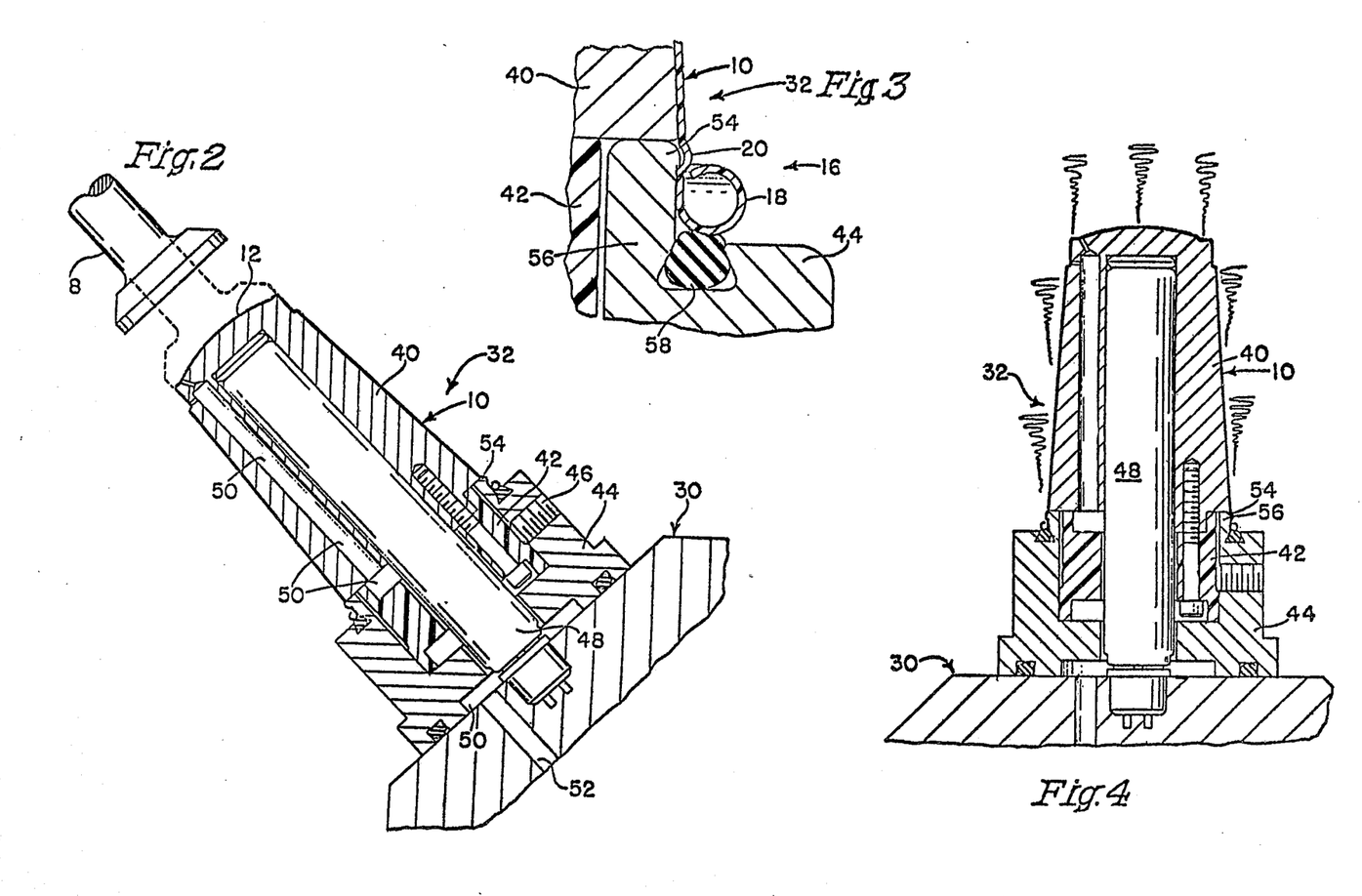
FIG. 2 is an enlarged semi-diagrammatic sectional view of a nestable plastic container being mounted in fixed relative position to a male mold member.
FIG. 3 is an enlarged fragmentary sectional view which depicts the manner in which the area in the vicinity of the open mouth of a nestable container is engaged by the male mold member in fixed and sealed position relative thereto.
FIG. 4 is a view similar to FIG. 2 and illustrating the heating of the nestable container while mounted on the male mold member.

Each male mold member 32, as seen for example in FIG. 2 of the drawing, includes a mandrel or plug 40 having an outside shape generally complementary to the inside shape of the nestable container 10, and insulator 42, and a mounting base 44 to which the mandrel 40 and insulator 42 are mounted by the fasteners 46 illustrated respectively as a machine bolt and set screw. The male mold member further includes a plug-in heater 48 wherein the outlet portion thereof is adapted to be plugged into an outlet box in the rotary turret, the body of the plug-in heat 48 being mounted within an elongated aperture provided in the mandrel, insulator, and mounting base 40, 42, 44, respectively. Inter-connecting passageways in the male mold member 32 each designated by the numeral 50 communicates with an air source (not shown) connected to the channel 52 formed in the rotary turret 30. The air supply is designed to establish a negative air pressure to hold the nestable container in close conforming relationship to the mandrel 40 during the heating thereof by the heater 48, and thereafter a positive air pressure to expand the nestable container against the non-nestable inner wall configuration of the female mold 34 when a respective male mold member 32 is telescopically inserted therewith.

The locking portion of each male mold member 32 is best seen in FIG. 3 of the drawing. In the illustrated embodiment, the locking portion of the respective male mold member 32 comprises a radially outwardly extending shoulder or protuberance 54 which extends from the depending collar 56 of the mounting base 44. The locking shoulder or protuberance 54 is complementary configured with respect to the locking bead 20 of the nestable container 10 such that the nestable container 10 can be releasably locked thereto.

It will now be understood that when the axial tamping means 38, as best seen in FIG. 2 of the drawing, engages the bottom wall of the nestable container 10 to move it into properly seated position on the male mold member 32, the circumferentially extending bead 20 on the container 10 will be brought into releasably locked engagement with the radially outwardly extending shoulder or protuberance 54. It is to be noted that the insulator 42, which is preferably molded from a heat insulated plastic material, extends between the heater 48 and the depending collar 56 for the purpose of shielding the rim portion 18 and locking bead 20 in the rim area 16 of the nestable container 10 from being heated to a temperature where the container is readily deformable. The remainder of the nestable container 10, that is, that portion of the nestable container below the locking bead 20, including the bottom wall 12, is designed to be heated to a temperature where the plastic material of which the nestable container is made, can be readily deformed.

The heating of the nestable container 10, which is specifically shown in FIG. 4 of the drawing, is designed to take place immediately upon the depositing of a nestable container 10 on a respective male mold member 32 from the container dispensing device 36. Since the heating of the selected portions of the nestable containers 10 to a forming temperature is a critical element in the molding of consistently uniform products, the positioning of nestable containers 10 on respective male mold members 32 and the indexing of the male mold members, in time clock analogy, from the 9 o'clock position shown in FIG. 1 where nestable containers are first deposited on male mold members to the 6 o'clock position where respective male mold members are designed to cooperate with the female mold means 34 in reshaping nestable containers 10, enables heat to be applied over a large portion of the forming cycle. This is very desirable since it is important that the nestable containers 10 be properly heated in the selected areas thereof to its forming temperature such that the reshaping operation does not produce any thick or thin areas in the non-nestable container 24 that is produced.

To assist in the uniform application of heat to the selected areas of the nestable containers 10 that are to be heated, a negative air pressure is established through the inter-connected passageway 50 of the male mold member 32 and the channel 52 of the rotary turret which is connected to an air supply, also operated in timed sequence to the indexing of the rotary turret to establish the negative air pressure when the nestable container 100 has been releasably locked on the male mold member 32. The locking shoulder or protuberance 54 of the male mold member 32 in its interengagement with the locking bead 20 of the nestable container 10 establishes a sealed relationship where the nestable container 10 is sealed to the male mold member 32 from the remaining atmosphere, enabling the negative air pressure to be properly established through the communicating passageways 50 and channel 52.

A secondary seal is also established by the contact of the O-ring 58 which engages the upper inner margin of the nestable container 10 as best seen in FIG. 3 of the drawings. The O-ring 58 is mounted within a trapezoidal shape aperture provided in the mounting base 44 at a position where the O-ring 58 can engage the upper inner margin of the nestable containers 10. While O-ring 58 is specifically provided to establish a seal for the nestable container 10 when telescopically associated within the female mold 34, it can also serve as a secondary seal for the nestable container 10 when the negative air pressure is applied as will be readily apparent.

With nestable containers 10 suitably mounted upon and properly heated to the forming temperature, the next stage of the forming cycle is the introduction of the male mold member 32 with heated nestable container 10 thereon within the female mold means 34. The female mold means 34 comprises a lower platen 60 upon which rests a housing 62, itself containing an unsplit lower mold section 64 into which is mounted a knock-out plunger 66 and split upper mold section 68. As will be apparent, the inner wall configuration of the unsplit lower mold section 64 and the split upper mold section 68, together with the top surface of the knock-out plug 66, defines the non-nestable inner wall configuration of the female mold means 34.

Figure 5:
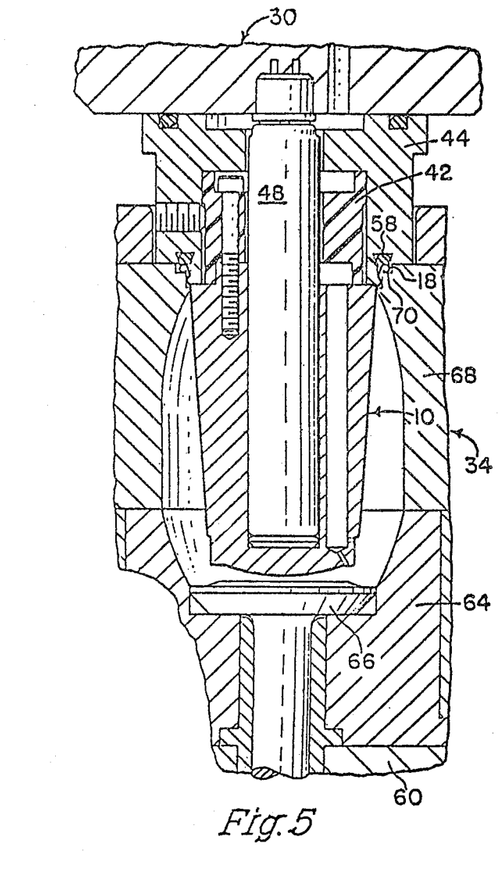
FIG. 5 is a semi-diagrammatic sectional view showing the nestable container relative to male and female mold elements just prior to the expansion of the nestable container into a non-nestable container product.
Figure 6:
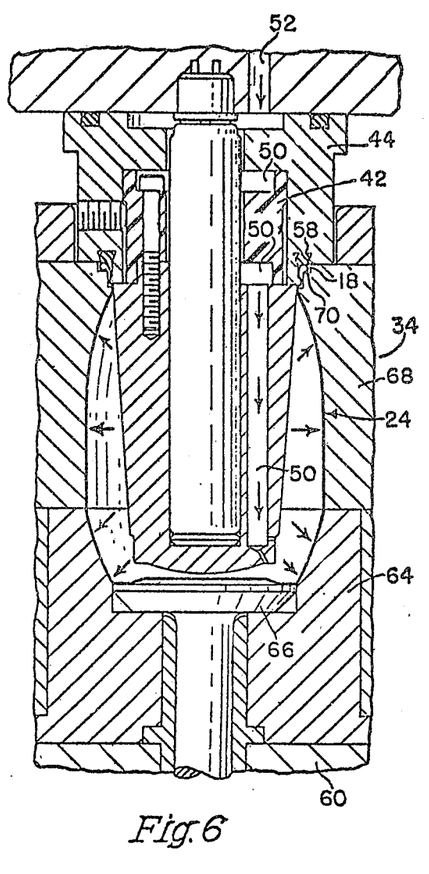
FIG. 6 is a view similar to FIG. 5, but at a slightly later portion of the forming cycle where the non-nestable container has been expanded by differential fluid pressure against the non-nestable inner wall configuration of the female mold.

The lower platen 60 is mounted upon suitable reciprocating means which moves the female mold 34 upwardly into telescopic association with the male mold member 32 and nestable container 10 mounted thereon as well as downwardly out and away from the respective male mold member 32 to enable the non-nestable container 24 that is formed to be ejected from the female mold as will be presently described. The reciprocating means (not shown) driving the lower platen 60 is also synchronized with the indexing of the rotary turret 30 such that when a respective male mold member 32, in time clock analogy, is positioned at the 6 o'clock position as illustrated in FIG. 1 of the drawing, the lower platen 60 has moved to a position where the female mold 34 telescopically surrounds a nestable container 10 mounted on a male mold member 32. When the female mold member 34 is moved to this position, the split upper mold sections 68, which may be 2, 4, or the like in number, are in closed position as is illustrated in FIGS. 1 and 5-6 of the drawing. The upper split mold sections 68 are moved toward and away from one another by suitable means (not shown) such as springs and cam elements.

In order to create the proper environment for the reshaping operation, it is necessary to seal off the nestable container from the outside atmosphere when deposited within the female mold 34. This is accomplished as best seen in FIGS. 5-6 of the drawings, by the use of an internal step 70 formed in the upper split mold sections 68 in a position directly opposite the O-ring 58. The step 70 is configured and dimensioned to receive the rim portion 18 of the nestable container 10, thus enabling the O-ring 58 to engage the upper inner margin of the container 10 at the beginning of the rim portion 18, while the step 70 engages the lowermost area of the rim portion 18. Since the O-ring 58 extends beyond the lower face of the mounting base 44, it is capable of trapping the rim portion between it and the step 70 of the female mold 34 to provide a seal for the nestable container 10 when mounted in the female mold 34.

When the heated nestable container 10 is telescoped within the female mold 34 and sealed from the outside atmosphere in a manner which is described above, it is then possible to reshape the heated nestable container 10 by the use of differential air pressure. In the illustrated embodiment, positive air pressure introduced through the communicating channel 52 and inter-connecting passageways 50 in the male mold member 32 to expand the heated nestable container 10 against the non-nestable inner configuration of the female mold 34. Suitable ports are provided in the female mold to permit the evacuation of the air trapped between the outer wall of the container and the non-nestable inner wall configuration of the female mold 34. This stage or step in the forming cycle is best illustrated in FIG. 6 of the drawing. There it will be noted that all of the nestable container 10 that is below the rim areas 16 of the nestable container, including the rim portion 18 and locking bead 20 is deformed to the non-nestable inner wall configuration of the female mold 34 as defined by the inner wall surfaces of the unsplit lower mold section, the knock-out plug and the split upper mold section 64, 66, and 68, respectively. As will be seen, the upper split mold sections 68 immediately below the step 70 has a configuration conforming to the rim area 16 of the nestable container 10 which also remains undeformed in the non-nestable container 24.

Figure 7:
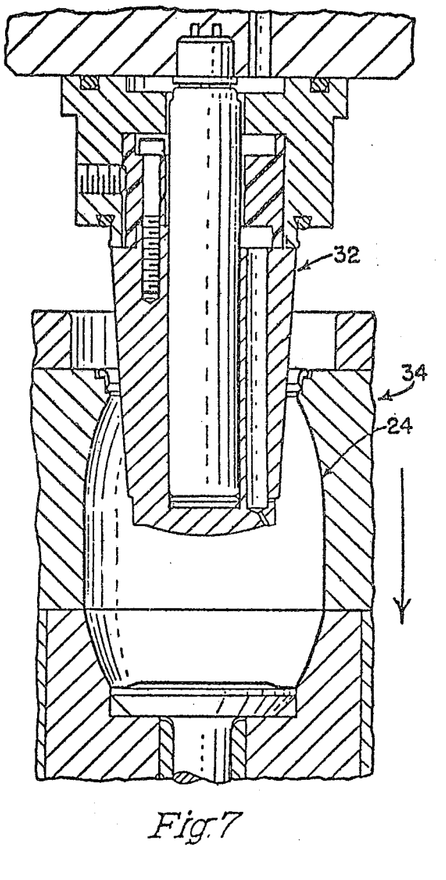
FIG. 7 is a view similar to FIGS. 5-6 and illustrates the telescopic disassociation of the male and female molds just after forming of the non-nestable container products.
Figure 8:
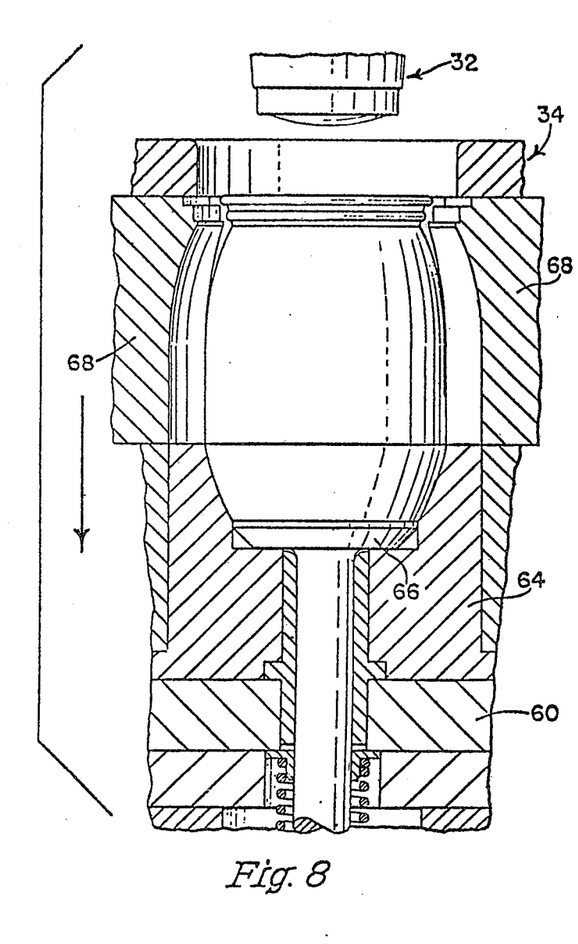
FIG. 8 is a view similar to FIGS. 5-7 which depicts the apparatus and method at that portion of the molding or forming cycle where the female mold is opened up along split mold sections to permit removal of the non-nestable container products.
Figure 9:
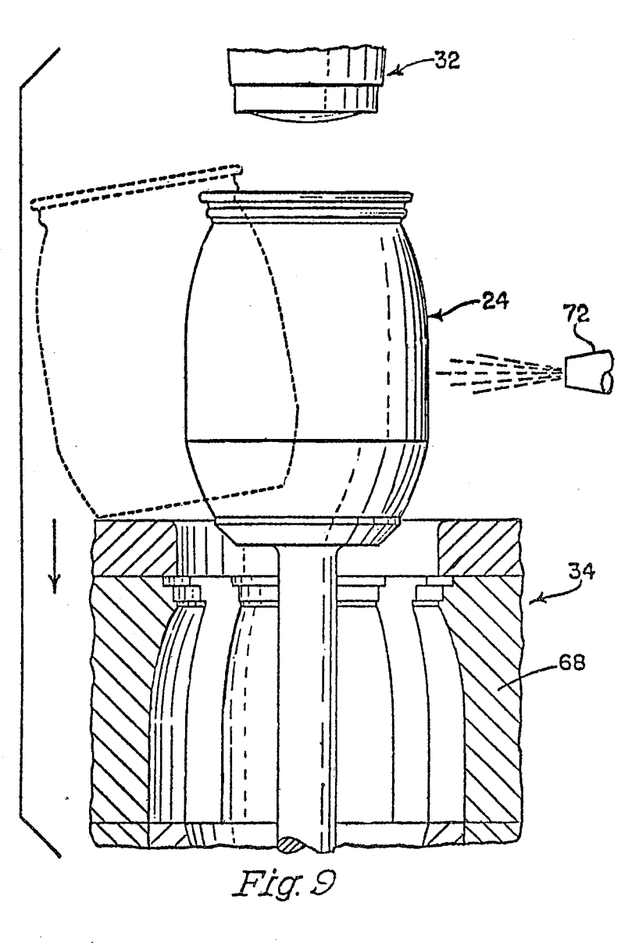

Since the female mold 34 is preferably chilled or at least relatively cold as compared with the heated plastic material of the non-nestable container 24 that has been formed, the non-nestable container 24 is formed or set relatively quickly. Thereupon, it can be removed from the cooperating molds 32 and 34. This is begun as illustrated in FIG. 7 by the downward movement of the female mold 34 for telescopically disassociating the male mold member 32 from the female mold member 34. Downward movement of the female mold 34 is continued and the upper split mold sections 68 are opened up as is best illustrated in FIG. 8 of the drawing. When the female mold 34 has been lowered to a point where the distance between its uppermost surface and the male mold member 32 is greater than the axial height of the non-nestable container 24, as best illustrated in FIG. 9 of the drawing, the knock-out plunger 66 is then moved upwardly to eject the non-nestable container 24 from the female mold 34 to a position immediately thereabove. When so positioned in this manner, as illustrated in FIG. 9, a product removal means such as an air jet 72 may be employed to blow the container to a product collecting means.

With the reshaping cycle now completed, the female mold 34 may again be advanced relative to the rotary turret 30 in synchronization with the indexing thereof of a respective male mold member 32 to be next brought into cooperative molding position to the female mold 34, to again produce a non-nestable container 24 in the manner heretofore described.

Figure 13:
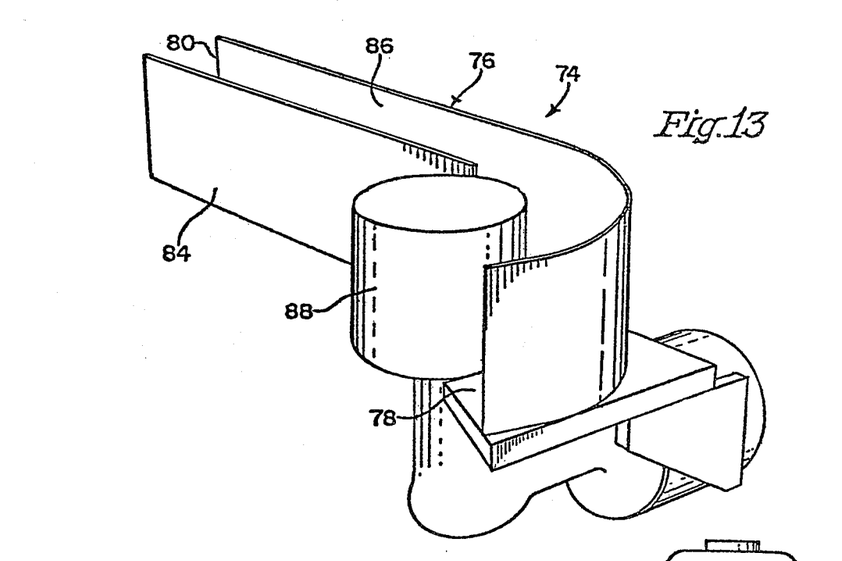
FIG. 13 is a reduced in size perspective view of a product removal apparatus which may be utilized with the herein disclosed method and apparatus.
Figure 14:
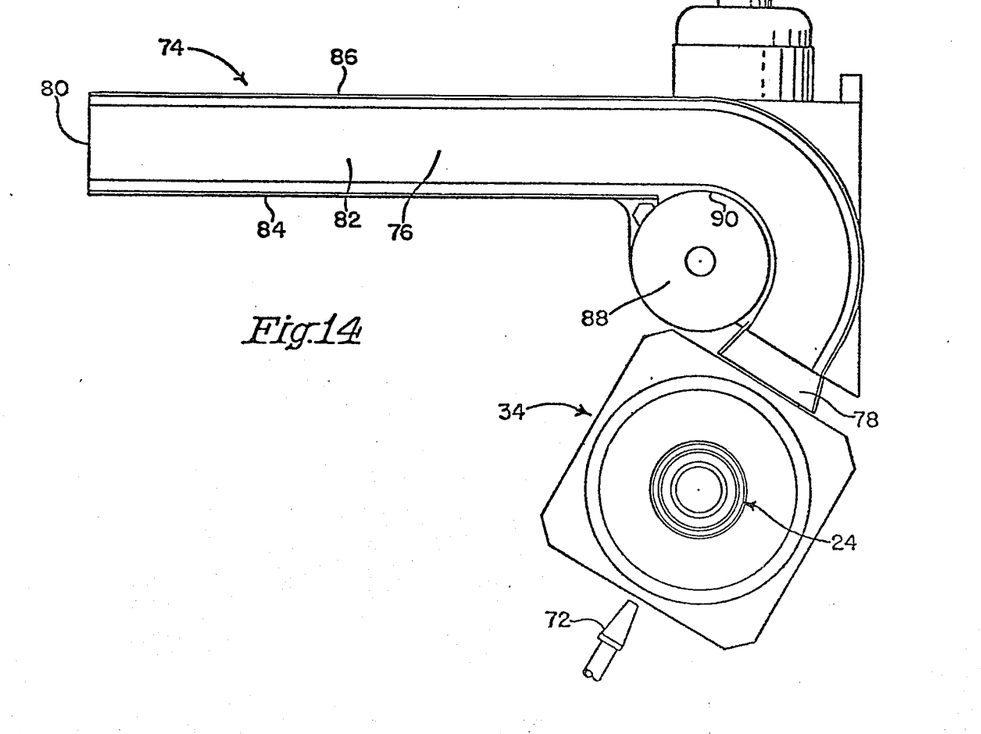
FIG. 14 is a top elevational view, reduced in size, illustrating the manner in which the product removal apparatus of FIG. 13 may be positioned relative to the female mold of the apparatus illustrated in FIG. 1 of the drawing.
Figure 15:
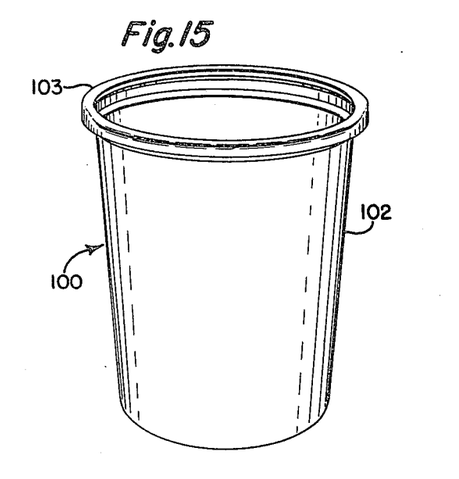
FIG. 15 is a perspective view of another nestable container used in the method and apparatus of the invention.

One particularly effective type of product collecting means that may be employed with the method and apparatus reshaping technique herein disclosed, is illustrated in FIGS. 13–14 of the drawing. The product collecting means 74 can be positioned immediately adjacent the female mold 34 such that non-nestable containers 24 blown from the female mold 34 by the air jet 72 can be deposited within the product collecting means 74.

It will be appreciated that separation of a container from mold members, such as by air pressure, cannot be accurately controlled. In addition to the difficulty of collecting the containers, they may be positioned in various predetermined attitudes which makes it difficult to properly orient them. Where a reshaping method and apparatus of the type described is adapted for use in conjunction with a filling line, it is desirable that containers be quickly deposited in oriented fashion on the conveyor leading into the filling apparatus.

To accomplish this, the product collecting means 74 has been devised to collect or "catch" non-nestable containers 24 blown from the female mold 34 by the air jet 72, as well as orient and convey the containers to a predetermined location such as the filling line conveyor. The product collecting means 74 includes a channel-shaped element 75 having inlet and outlet ends 78, 80, respectively. The channel-shaped element 76 is defined by a fixed bottom wall or plate 82 and opposed inner and outer side walls 84, 86, respectively.

In the area immediately adjacent the female mold 34, the channel-shaped element 76 is provided with a predetermined curvature which, in the illustrated embodiment in FIGS. 13–14, extends over an arc greater than 90°. The channel-shape element 76 in the area of predetermined curvature is associated with a rotating conveyor drum 88 which is disposed in an opening on the inner side wall of the channel-shaped element 76. The rotating conveyor durm 88 is arranged with respect to the outer side wall 86 of the channel-shaped element 76 in the area of predetermined curvature thereof, such that the peripheral surface 90 is spaced from the proposed outer side wall 86 of the channel-shaped element 76 by a distance not greater than the maximum dimension of the non-nestable container 24. Preferably, the spacing between the peripheral surface 90 of the rotating conveyor drum 88 and the outer side wall 86 of the channel-shaped element 76 is such that the peripheral surface 90 lightly compresses the container side wall for lightly gripping the non-nestable container 24.

The peripheral surface 90 of the rotating conveyor drum 88 is preferably provided with a friction face such as by a rubber belt or the like, to assure non-slipping engagement of the rotating conveyor drum 88 with the non-nestable containers 24 and thereby provide slow rotation of the containers 24 as they are slid along the inner wall surface of the outer side wall 86. Containers 24 are thus lightly caught and conveyed by the rotating conveyor drum 88 in the area of predetermined curvature of the channel-shaped element 76 to the point where the dimension between the peripheral surface 90 of the rotating conveyor drum and the outer side wall of the channel-shaped element 76 is greater than the maximum dimension of the container side wall. In the illustrated embodiment, this occurs generally at the beginning of the straight line portion of the channel-shaped element 76. At this point, the non-nestable containers 24 are no longer engaged by the rotating conveyor drum 88, thereby permitting the non-nestable container 24 to be light deposited in the straight section of the channel-shaped element 76 where the dimension between the proposed inner and outer side walls thereof is preferably only slightly greater than the maximum dimension of the nestable container 24.

From the foregoing, it will be appreciated that the fabrication technique herein disclosed for reshaping nestable plastic containers into non-nestable plastic containers, permits high-speed, low-cost production of non-nestable plastic containers of consistently uniform and high quality. The freedom of non-nestable container design inherent in the reshaping techniques together with the immediate commercial potential of the herein disclosed reshaping techniques provides a commercially attractive program for the non-nestable container packager as well as for the ultimate consumer.

In the embodiment of FIGS. 15–20 and the embodiment of FIGS. 21–26, it is intended that the previously described process and apparatus be used except for the differences hereinafter described. The primary difference between the previously described embodiment of the invention and the embodiments of FIGS. 15–26 is that the processes and apparatus for FIGS. 15–26 use nestable containers with stacking means in the rim portion or area of the nestable containers. The stacking means in the rim portions includes the means for holding the nestable containers on the male mold or mandrel. In the blowing or molding of the non-nestable or reformed containers at least a portion of the stacking means is removed. In the embodiment of FIGS. 15–20 the remaining upper portion of the stacking means is used as a lid seat. In the embodiment of FIGS. 21–26 the lower portion of the stacking means is reformed into a lid seat. From the foregoing it may be seen that in the embodiments of FIGS. 15–26, the stacking means has a number of different functions in the process and apparatus of the invention; firstly, the stacking means provides for the non-jamming transport and storage of a stack of the preform nestable containers; secondly, the stacking means provides a means for holding the nestable container on the mandrel; and thirdly, a portion or a reformed portion of the stacking means provides a lid seat.

In the embodiment of FIGS. 15–20 the preform or nestable container 100 is made of a relatively thin plastic material that can be heated to a molding temperature and then blown or reformed to another shape. One method by which the container 100 may be formed is by thermoforming of a plastic sheet material. The container 100 has a generally frusto-conical shape and comprises a bottom wall 101, an upwardly diverging sidewall 102, and an open top defined by a rim portion 103.

Figure 18:
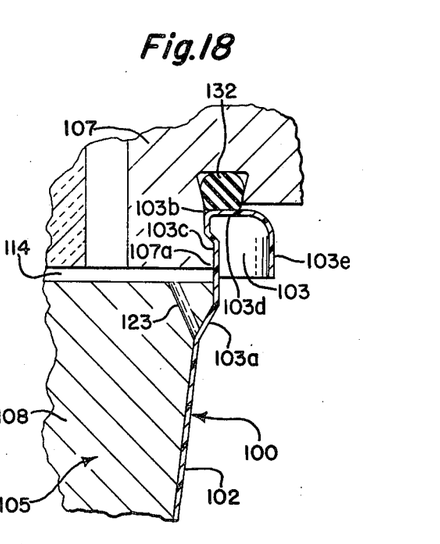
FIG. 18 is an enlarged fragmentary view of a portion of the structure shown in FIG. 17 showing the cooperation of the container with the male mandrel assembly.

As may be seen in FIG. 18, the rim portion 103 of the container 100 includes a stacking means which comprises a lower stacking shoulder 103a, an upper internal shoulder 103b, and an intermediate wall section 103c. The rim portion 103 further includes a wall 103d which extends radially outwardly of the upper internal stacking shoulder 103b, and a skirt 103e which circumferentially depends from the outer edge of the wall 103d. If desired, the lower portion of the skirt 103e may be formed to curve toward the intermediate shoulder 103c.

Figure 16:
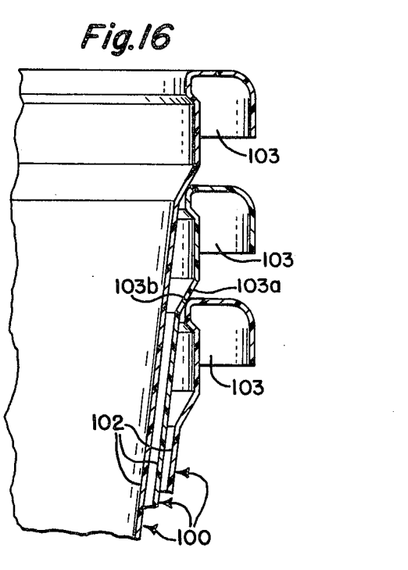
FIG. 16 is an enlarged fragmentary cross-sectional view of a number of containers of FIG. 15 showing the stacking arrangement.

The first function of the stacking means of the rim portion 103 may be seen in FIG. 16. When a plurality of containers 100 are arranged in a nested stack as shown, the lower stacking shoulder 103a of one container 100 will rest upon the upper internal shoulder 103b of the next lower container 100 to maintain the containers 100 in an axially spaced apart relationship in the stack. That arrangement will effectively prevent a stack of such containers from jamming in the transport and storage of the stack.

Figure 17:
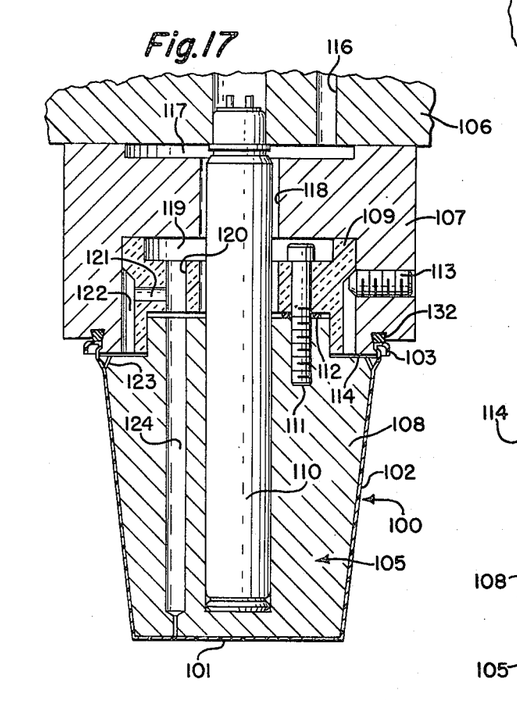
FIG. 17 is a cross-sectional view of the male mandrel assembly with a container of FIG. 15 mounted thereon.

The second function of the stacking means of the rim portion 103 of each container 100 is to lock the container 100 onto the mandrel 105, as shown in FIGS. 17 and 18. When a container 100 is removed from the stack, it is tamped onto the mandrel 105 in the manner described relative to the first embodiment of the invention. The mandrel 105 as shown is an assembly of a number of representative parts for receiving and heating a container 100. A support member 106 carries the mandrel assembly on a rotary turret such as rotary turret 30 of FIG. 1. A support member 107 is secured to the member 106.

The mandrel assembly 105 further comprises a plug 108 which is configured to the internal shape of the container 100, an insulator member 109, and an electric heater 110. The insulator member 109 is generally annular in shape and the plug 108 is secured to the insulator member 109 by a number of circularly arranged fasteners such as fastener 111. Washers such as washer 112 are interposed between the plug 108 and the insulator member 109. The insulator member 109 is held in the support member 107 by set screws such as set screw 113. In that mounted condition of the insulator member 109 an annular space 114 is provided between the support member 107 and the plug 108. The heater 110 is carried on the axis of the mandrel assembly 105 and extends from the support member 106 through an opening in the support member 107, an opening through the insulator member 109, and into the plug 108. The heater 110 is in good thermal contact with the plug 108 but any thermal contact with the support member 107 or the insulator member 109 is effectively avoided. The annular space 114 effectively prevents the plug 108 from heating the support member 107. Any suitable power conductors may be provided through the rotary turret and support member 106 to operate the heater 110. It may be seen in FIGS. 17 and 18 that when a container 100 is tamped into the mandrel assembly 105 the upper portion of the stacking means of the rim portion 103 will lock over an annular projection 107a of the support member 107 to prevent the container 100 from shrinking off of the mandrel assembly 105 as the container 100 is heated. The upper portion of the stacking means of the rim portion 103 is not heated and thus will maintain its original shape during the blowing process of the remainder of the container therebelow.

Figure 19:
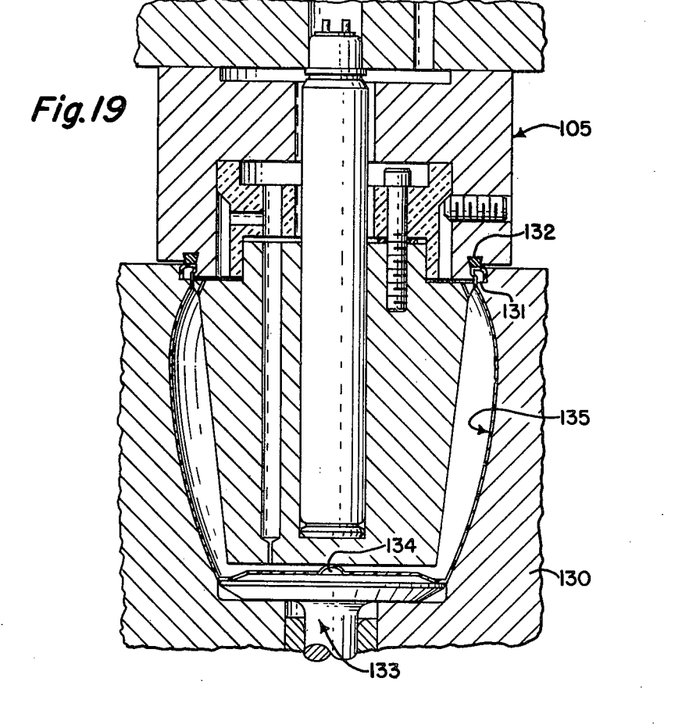
FIG. 19 is a cross-sectional view of the mandrel assembly of FIG. 17 associated with a female mold and showing the reformed container.

A number of air passageways are shown in somewhat diagrammatic form in FIGS. 17 and 18. Those passageways are provided for drawing air from the area between the plug 108 and the container 100, and for blowing the reformed container after the mandrel assembly 105 with the container 100 thereon heated to blow molding temperatures is inserted in the female blow mold as shown in FIG. 19. Those air passageways comprise air passageway 116 in support member 106, passageways 117 and 188 in support member 107, passageways 119, 120, 121 and 122 in the insulator member 109, annular space 114, and passageways 123 and 124 in the plug 108.

The next step in the process and of the apparatus of the embodiment of FIGS. 15–20 is the placement of the mandrel assembly 105 with the heated container 100 thereon into the female blow mold 130, shown somewhat diagrammatically and partially in cross section in FIG. 19. The female blow mold 130 has an interior configuration substantially conforming to the desired shape of the non-nestable reformed container. The upper end of the female blow mold 130 has a recess 131 which receives the skirt 103e of the rim portion 103 therein and, which in cooperation with the mandrel assembly 105 and a sealing ring 132 in the support member 107, effectively seals the container 100 for blowing.

The lower end of the blow mold 130 includes a knock-out and centering assembly 133. A projection 134 is provided on the knock-out assembly. The height of the projection is such as to cause a slight indentation of the projection 134 into the bottom center of the container 100 when the mandrel assembly 105 is inserted into the female blow mold 130. In reductions to practice of the invention it has been found that an identation in the order of 0.002 of an inch is sufficient to key or firmly hold the bottom wall of the container 100 against sideways slipping during blowing to insure that the blown non-nestable container will be uniformly circumferentially blown.

The blown non-nestable container is shown in cross section at 135. It should be noted that in the forming of the non-nestable container 135, the lower portion of the stacking means of the rim portion 103 is removed. The lower portion of the stacking means comprises the lower portion of the intermediate wall section 103c and the lower stacking shoulder 103a. The remaining rim configuration in the non-nestable container 135, including the upper portion of the stacking means, provides a lid seat for a lid such as lid 136, which is shown in cross section in FIG. 20. The lid 136 includes an annular projection 136a which releasably locks beneath the upper internal shoulder 103b when the lid 136 is applied to the non-nestable container 135.

In the embodiment of FIGS. 21–26, the preform or nestable container 150 is formed of a relatively thin plastic material that can be heated to a molding temperature and then blown or reformed to another shape. The preferred method by which the container 150 may be formed is by an injection molding process. The container 150 has a generally frusto-conical shape and comprises a bottom wall 151, an upwardly diverging side wall 152, and an open top defined by a rim portion 153.

Figures 21, 22, 23, 24:
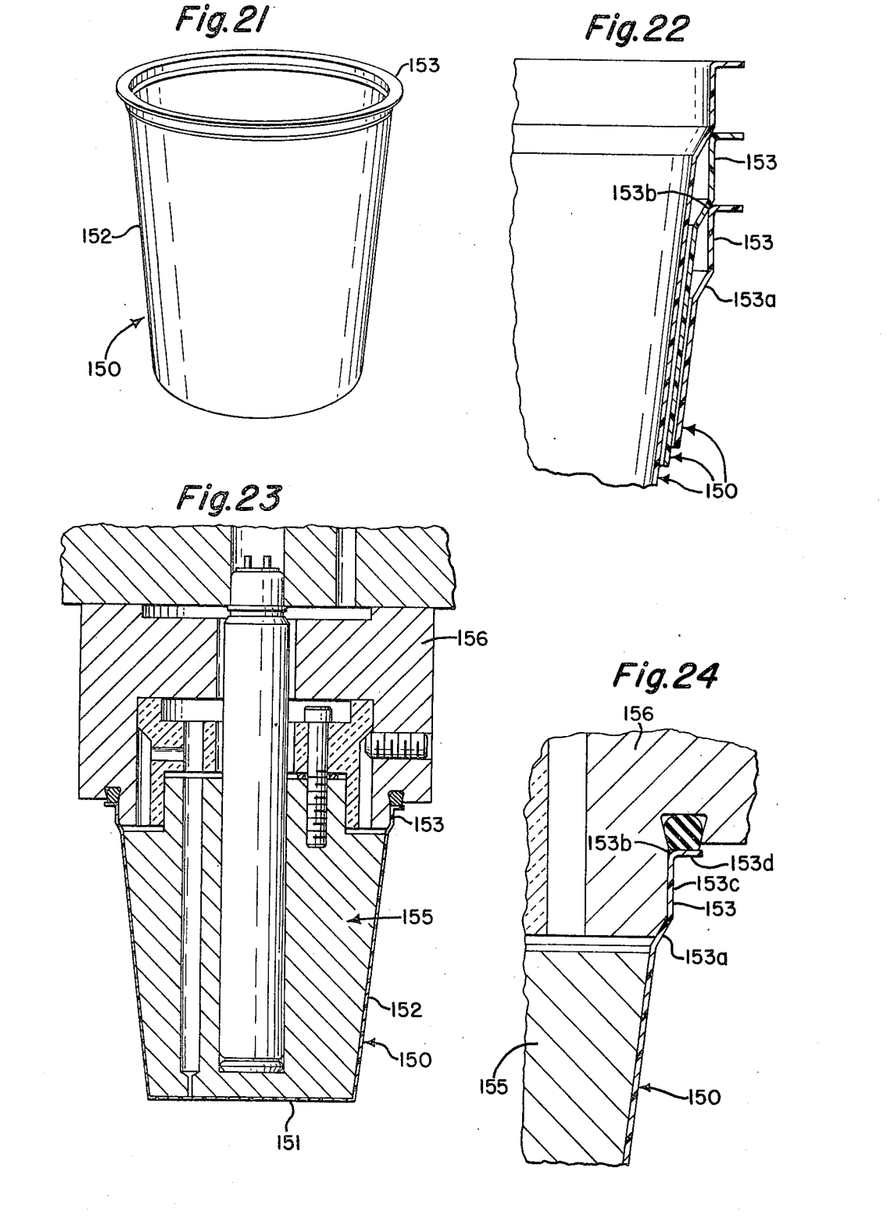
FIG. 21 is a perspective view of another nestable container for the process and apparatus of the subject invention.
FIG. 22 is an enlarged fragmentary cross-sectional view of a number of the containers of FIG. 21 showing the stacking arrangement of such containers.
FIG. 23 is a cross-sectional view of the male mandrel assembly with one of the containers of FIG. 21 mounted thereon.
FIG. 24 is an enlarged fragmentary view of a portion of FIG. 23 showing the cooperation between the container rim portion and the male mandrel.

As may be seen in FIG. 24, the rim portion 153 of the container 150 includes a stacking means which comprises a lower stacking shoulder 153a, an upper internal shoulder 153b, and an intermediate wall section 153c. The rim portion 153 further includes a wall 153d which extends radially outwardly of the upper internal stacking shoulder 153b.

The first function of the stacking means of the rim portion 153 may be seen in FIG. 22. When a plurality of containers 150 are arranged in a nested stack as shown, the lower stacking shoulder 153a will rest upon the upper internal shoulder 153b of the next lower container 150 to maintain the containers 150 in an axially spaced apart relationship in the stack. That arrangement with effectively prevent a stack of such containers from jamming in the transport and storage of the stack.

The second function of the stacking means of the rim portion 153 of each container 150 is to lock the container 150 onto the mandrel assembly 155, as shown in FIGS. 23 and 24. When a container 150 is removed from the stack, it is tamped onto the mandrel assembly 155 in a manner described relative to the first embodiment of the invention. Except for the configuration of the lower portion of the support member 156 the various parts of the mandrel assembly 155 are as previously described relative to the embodiment of FIGS. 15–20. The lower portion of the support member 156 is configured to conform to the inner configuration of the rim portion 153 of the container 150. When the container 150 is formed by the preferred injection molding process it has been found that the rim portion 153 has sufficient strength to frictionally lock onto the lower portion of the support member 156 to hold the container 150 on the mandrel assembly 155 against shrinking of the container 150 off of the mandrel assembly 155 during heating of the container 150.

The rim portion 153 is not heated during the heating of the remainder of the container 150. Upon the container 150 reaching blow molding temperatures, the mandrel assembly 155 with the heated container 150 thereon is inserted in a female blow mold assembly 160 which is shown in a fragmentary cross sectional view in FIG. 25. The female blow mold assembly 160 has an internal configuration conforming to the desired external shape of the non-nestable reformed container 161. The lower portion of the mold assembly 160 includes a knock-out and centering assembly 133 identical to that described relative to the embodiment of FIGS. 15–20.

Figure 25:
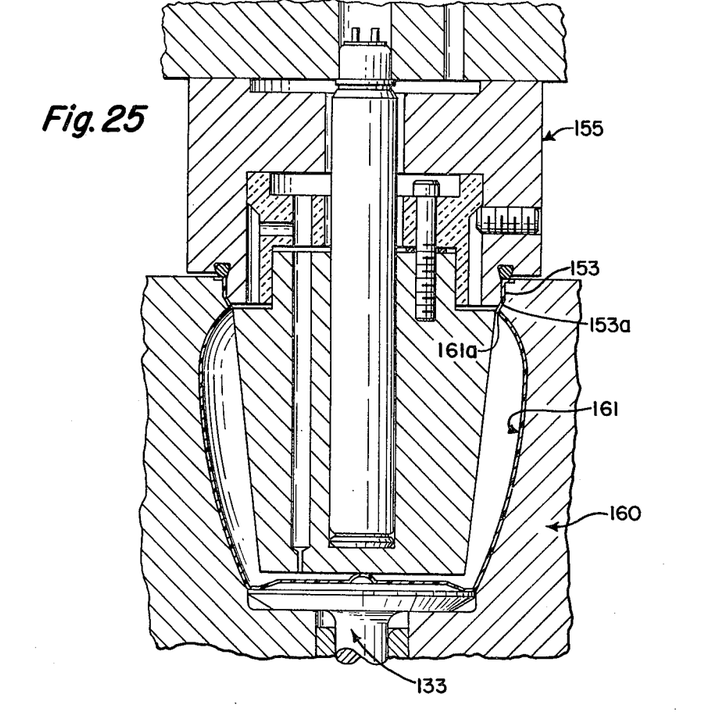
FIG. 25 is a cross-sectional view showing the mandrel assembly of FIG. 23 associated with a female mold and further showing the reformed container; and, FIG. 26 is an enlarged fragmentary cross-sectional view of the reformed container of FIG. 25 with a lid applied thereto.
Figure 26:
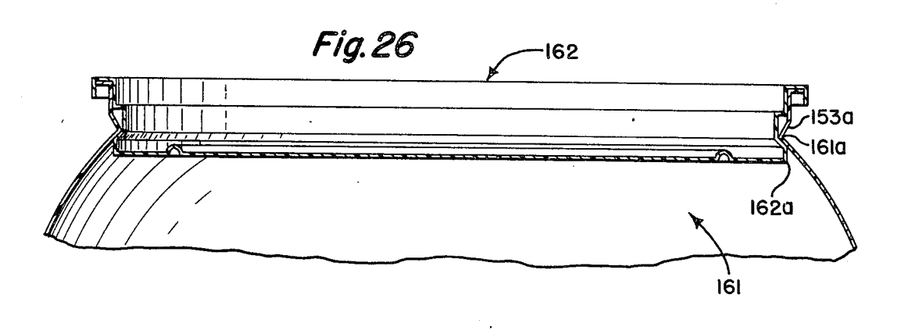

The upper portion of the female blow mold assembly 160 is shaped so that upon blowing, the lower stacking shoulder 153a will form with the portion of the blown container 161 immediately therebelow an inwardly projecting lid seat 161a. A lid 162 having an annular outwardly extending projection 162a cooperates with the lid seat 161a to releasably retain the lid 162 on the non-nestable container 161.

From the foregoing description of the embodiments of FIGS. 15–26, it may be seen that the process and apparatus of the subject invention contemplates a nestable preform container having stacking means in the rim portion for preventing jamming of a stack of such containers, with at least a portion of the stacking means being unheated and with that portion of the stacking means cooperating with the mandrel assembly to hold or lock the preform on the mandrel assembly. It may further be seen that those embodiments further contemplate at least the partial removal or reforming of the stacking means to provide a lid seat for a lid on the reformed container.

I claim:

1. Apparatus for high-speed forming of a nestable plastic container into a non-nestable container comprising, a rotary indexing turret having a plurality of circumferentially spaced male mold members each having thermally insulated shoulder means for cooperating solely with the internal wall of the rim portion of one of said nestable containers to releasably mechanically lock the nestable containers thereto, means mounted in cooperation with said turret for receiving a nested stack of said nestable containers and for telescopically depositing said nestable containers one at a time on successive male mold members in synchronization with the indexing of the rotary turret, means mounted in cooperation with said turret for positively mechanically forcing the internal rim portion of each nestable container which is telescopically deposited on a male mold member over said thermal insulated shoulder into releasably mechanically locked position relative to the male mold members, heating means mounted within each of said male mold members and operating to conductively heat said nestable containers below the rim portions thereof cooperating with said thermally insulated shoulder means when releasably mounted on a respective male mold member to a temperature where the nestable containers below said rim portions are readily deformable, and means mounted in cooperation with said turret for pressure-forming each heated nestable container below said rim portion to a non-nestable container while the container is releasably locked relative a respective male mold member.

2. The apparatus as defined in claim 1 wherein the means for pressure-forming nestable containers into non-nestable containers comprises a split mold means which is telescopically associated and sealed relative to respective male mold members carrying heated nestable containers thereon, and means associated with each male mold member for introducing differential air pressure between the exterior and interior of each heated nestable container within the split mold means to convert a nestable container into a non-nestable container.

3. In an apparatus for converting a stack of substantially thin-walled nestable plastic containers into a plurality of non-nestable containers having upwardly bowed bottom walls wherein each of the nestable containers have a downwardly bowed bottom wall and a stacking ring in the side wall to prevent jamming of adjacent nestable containers in a stack and wherein a nested stack of said nestable containers at ambient temperatures are received at said apparatus, the improvement of a rotary turret mounted for rotation about a horizontal axis, a plurality of male mold members extending radially outwardly of the rim of said turret in a circle thereabout, means for horizontally supporting said nested stack of nestable containers in axial alignment with one of said male mold members disposed on a substantially horizontal axis, means for separating and moving the lead nestable container from the stack and onto said first male mold member, said male mold members having a shape complementary to the internal shape of said nestable containers including an outwardly rounded bottom wall and a thermally insulated shoulder mechanically cooperable with the internal wall surface of the rim portion of one of said nestable containers to releasably mechanically hold said nestable container on said complementary configured male mold member, means for rotating said turret to move said first complementary configured male mold member with said leading nestable container thereon through the arc of a circle aligned in a vertical plane upwardly and away from said horizontally supported nested stack of nestable containers, means for stopping and restarting said turret to index successive ones of said male members in said horizontal position to receive further ones of said nestable containers, said means for separating and removing the lead nestable container further incrementally advancing said horizontally supported stack of nestable containers adjacent to successive complementary configured male mold members moved in axial alignment therewith and successively applying said nestable containers from said horizontally supported nested stack and onto said successive complementary configured male mold members, means for internally heating each of said complementary configured male mold members to conductively heat said nestable containers thereon below the rim portions thereof, a female mold member formed with an internal configuration complementary to the shape of said non-nestable containers, said female mold member mounted below said turret, said means for internally heating said complementary configured male mold members being further formed to conductively heat said nestable containers below said rim portions thereof to molding temperatures during the movement of said male mold members from said horizontal position to said downward position of said female mold member, means for closing said female mold member about one of said male mold members and said heated nestable container thereon at said downward position, means for delivering forming air under pressure to said heated nestable container in said female mold to blow said nestable container below said rim portion thereof into said non-nestable container in said female mold, and means for successively removing the pressure formed non-nestable containers from successive ones of said male mold members after said male mold members are moved away from said female mold and before reaching said horizontal position.

\* \* \* \* \*